US011673632B2

(12) United States Patent
Camarena-Vazquez (10) Patent No.: US 11,673,632 B2
(45) Date of Patent: Jun. 13, 2023

(54) CATAMARAN FOR A WHEELCHAIR (71) Applicant: Guillermo Camarena-Vazquez, Sydney (AU)

(72) Inventor: Guillermo Camarena-Vazquez, Sydney (AU)

( * ) Notice: Subject to any disclaimer, the term of this patent is extended or adjusted under 35 U.S.C. 154(b) by 247 days.

(21) Appl. No.: 17/049,999

(22) PCT Filed: Apr. 30, 2019

(86) PCT No.: PCT/AU2019/050387
§ 371 (c)(1),
(2) Date: Oct. 23, 2020

(87) PCT Pub. No.: WO2019/210357
PCT Pub. Date: Nov. 7, 2019

(65) Prior Publication Data
US 2021/0179238 A1    Jun. 17, 2021

(30) Foreign Application Priority Data

May 3, 2018   (AU) ................................ 2018901503

(51) Int. Cl.
| B63B 35/38 | (2006.01) |
| B63B 1/12 | (2006.01) |
| B63B 34/50 | (2020.01) |
| B60F 3/00 | (2006.01) |

(52) U.S. Cl.
CPC ............... *B63B 35/38* (2013.01); *B63B 1/12* (2013.01); *B63B 34/50* (2020.02); *B60F 3/0069* (2013.01)

(58) Field of Classification Search
CPC .. B63B 1/10; B63B 1/12; B63B 1/121; B63B 2001/123; B63B 1/14; B63B 2001/145; B63B 2003/085; B63B 7/00; B63B 2007/003; B63B 2007/006; B63B 7/02;
(Continued)

(56) References Cited

U.S. PATENT DOCUMENTS

| 4,480,568 A | 11/1984 | Trefethern et al. |
| 4,687,447 A * | 8/1987 | Hannappel ........... B63H 21/175 |
| | | 280/10 |
| 4,700,648 A | 10/1987 | Trefethern et al. |

(Continued)

FOREIGN PATENT DOCUMENTS

| GB | 2303103 B | 8/1997 | |
| GB | 2494309 A * | 3/2013 | ............... A61G 5/00 |

(Continued)

OTHER PUBLICATIONS

International Search Report for PCT/AU2019/050387 dated Jul. 10, 2019 in English (4 pages).

(Continued)

*Primary Examiner* — Ajay Vasudeva
(74) *Attorney, Agent, or Firm* — Fitch, Even, Tabin & Flannery, LLP (57) ABSTRACT

A catamaran for a wheelchair has two parallel pontoons secured abeam a bow beam and a wheelchair engaging framework for selective attachment and submersion of a wheelchair in water between the pontoons behind the bow beam in use. The catamaran is able to engage a wheelchair in a simple and convenient manner for recreational water sport use by those of limited mobility.

16 Claims, 9 Drawing Sheets

(58) Field of Classification Search
CPC ......... B63B 7/04; B63B 35/38; B60F 3/0069; A63B 35/12
See application file for complete search history.

(56) References Cited

U.S. PATENT DOCUMENTS

| | | | |
|---|---|---|---|
| 5,131,875 A * | 7/1992 | Lee .................... | B63H 20/007 440/6 |
| 5,291,846 A | 3/1994 | Davis, Jr. | |
| 9,045,200 B1 * | 6/2015 | Chaney ................. | B63B 34/05 |
| 9,446,639 B2 * | 9/2016 | Belanger ............... | B60F 3/0038 |

FOREIGN PATENT DOCUMENTS

| | | |
|---|---|---|
| JP | H077625 U | 2/1995 |
| JP | 2018062279 A | 4/2018 |
| SE | 525550 C2 | 3/2005 |
| WO | 2017024415 A1 | 2/2017 |

OTHER PUBLICATIONS

Written Opinion of the ISA for PCT/AU2019/050387 dated Jul. 10, 2019 in English (7 pages).
International-type search for AU Patent Application No. 2018901503 dated Jan. 15, 2019 in English (8 pages).

* cited by examiner

CATAMARAN FOR A WHEELCHAIR

CROSS-REFERENCE TO RELATED APPLICATIONS

This application is a U.S. national phase application filed under 35 U.S.C. § 371 of International Application No. PCT/AU2019/050387, filed 30 Apr. 2019, designating the United States, which claims priority from Australian Patent Application No. 2018901503, filed 3 May 2018, which are hereby incorporated herein by reference in their entirety for all purposes.

FIELD OF THE INVENTION

This invention relates generally to watercraft more particularly, this invention relates to a catamaran for a wheelchair.

SUMMARY OF THE DISCLOSURE

There is provided herein a catamaran for engaging a wheelchair in a simple and convenient manner for recreational water sport use by those of limited mobility.

The present catamaran comprises a pair of parallel pontoons spaced abeam a bow beam. The catamaran also comprises a wheelchair engagement framework for engaging a wheelchair between the pontoons.

Furthermore, the catamaran comprises thrusters located beneath respective pontoons for the propulsion of the catamaran. In this way, wheelchairs of different types may be quickly and easily connected between the pontoons for partial submersion and propulsion for recreational use.

In embodiments, the pontoons may be slidably retained along the bow beam so as to adjust the width of the catamaran to allow for the engagement of differing sized wheelchairs therebetween.

In this regard, in accordance with one embodiment, the pontoons may comprise transverse sleeves through which the bow beam slidably locate. The sleeves may be located at a forward location of the pontoons such that the bow beam locates in front of the wheelchair retained between the pontoons. Furthermore, the bow beam may be non-rotatably engaged within the sleeves, such as by each comprising a rectangular cross-sections.

In further embodiments, the bow beam itself may be telescopic comprising a central telescopic member within which lateral telescopic members are slidably retained.

Furthermore, in a preferred embodiment, the forward bow beam is configured for modular attachment of various accessories thereto, including underwater viewing hoods and various type of electrical and mechanical control systems. In this regard, the central portion of the bow beam may comprise a plurality of accessory attachment sleeves within which corresponding shafts of the accessories may be slidably engaged and retained by locking pins. In embodiments, the accessory attachment sleeves may comprise vertically and horizontally orientated sleeves for the horizontal and vertical engagement of the accessories therein.

The wheelchair engagement framework may comprise pontoon engagement members which engage within corresponding pontoon brackets and wheelchair engaging members which engage a wheelchair framework of the wheelchair.

In a preferred embodiment, the wheelchair engaging members are vertically offset adjustable with respect to the pontoon engaging members so as to control the depth of submersion of the wheelchair in use.

Furthermore, the pontoon engaging members may comprise horizontal beams which are laterally offset adjustable within the corresponding pontoon brackets and furthermore have sufficient reach so as to, for example, accommodate wheelchairs of differing widths and wheelchair tyres of differing widths, especially widened beach going wheelchair tyres.

In embodiments, the wheelchair engaging members comprise right-angled members which are able to be easily lowered over corresponding horizontal portions of the wheelchair framework for engagement. Locking pins inserted through distal ends thereof underneath the horizontal portions may lock the wheelchair framework within the right-angled members. In embodiments, certain of the right-angled members may be vertically offset adjustable so as to accommodate wheelchair frameworks of differing dimensions.

In accordance with one embodiment, the rearward pontoon engaging member may be rotatably engaged by the respective rearward pontoon bracket and, furthermore, the forward pontoon engaging member engaged within an open under channel of the forward pontoon bracket.

In this way, for the quick and easy attachment of the wheelchair to the pontoon, the rearward pontoon engaging member may be located within the rearward brackets of the catamaran and the catamaran lowered over the wheelchair such that the rearward pontoon engaging members slidably engage over the rearward wheelchair engaging members. During this manoeuvre, the pontoons may be pitched upwardly such that once the rearward pontoon engaging members have been engaged properly to the corresponding wheelchair engaging members, the forward ends of the pontoons may be lowered such that the forward pontoon engaging members slip into the open under channel of the forward pontoon brackets and which may be locked in place by way of locking pins.

According to one aspect, there is provided a catamaran for a wheelchair, the catamaran comprising: two parallel pontoons secured abeam a bow beam; and a wheelchair engaging framework for selective attachment and submersion of a wheelchair in water between the pontoons behind the bow beam in use.

The catamaran may further comprise a pair of thrusters located beneath respective pontoons.

The pair of thrusters may be electrically controllable by way of at least one electrical control accessory.

The pair of thrusters may be controllable by a handlebar control comprising handles selectively tensioning control cables corresponding to each thruster.

Each handle may be configured for controlling an oppositely located thruster.

The pontoons may be slidably retained along the bow beam.

The pontoons each may comprise a transverse sleeve through which the bow beam may be slidably located.

The bow beam may be non-rotatably located within each transverse sleeve.

The transverse sleeve and the bow beam may comprise corresponding rectangular cross sections.

The sleeves may be located at a forward location of the pontoons.

The bow beam may comprise slidably engaged telescopic members.

The bow beam may comprise a central telescopic member within which laterally opposite lateral telescopic members may be slidably retained.

The bow beam may comprise modular attachment brackets for the attachment of modular accessories thereto.

The attachment brackets may comprise sleeves within which corresponding shafts of the accessories may be slidably retained.

The sleeves may comprise at least one of vertically orientated and horizontally orientated sleeves.

The bow beam may comprise a rectangular cross-section and wherein the at least one of the vertically orientated and horizontally orientated sleeves may be located on corresponding vertical horizontal surfaces of the rectangular bow beam.

The wheelchair engaging framework may comprise forward and rearward pontoon attachment members each comprising horizontal bars engaged by respective forward and rearward pontoon brackets.

The horizontal bars may be laterally offset adjustably engaged within the respective pontoon brackets.

At least one of the horizontal bars may be rotatably engaged within a respective bracket and the other horizontal bar engages within an open under channel of the other respective bracket.

The wheelchair engagement framework further may comprise wheelchair attachment members for engaging a wheelchair framework of the wheelchair.

The wheelchair attachment members may be vertically offset adjustable with respect to the pontoon attachment members.

The wheelchair attachment members may be slidably retained within vertical sleeves of the pontoon attachment members.

The wheelchair attachment members may comprise right-angled members which engage over horizontal bars of the wheelchair framework.

The right-angled members may comprise locking pin apertures at distal ends thereof for the insertion of locking pins underneath the horizontal bars for securement.

At least a subset of the right-angled members may be vertically offset adjustable.

The right-angled members may comprise sleeves within which the wheelchair attachment members may be slidably retained.

The wheelchair attachment members may comprise upper right-angled members and lower right-angled members and wherein the lower right-angled members may be vertically offset adjustable.

At least one wheelchair attachment member may comprise a cylindrical insert configured for insertion within a corresponding cylindrical portion of the wheelchair framework.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
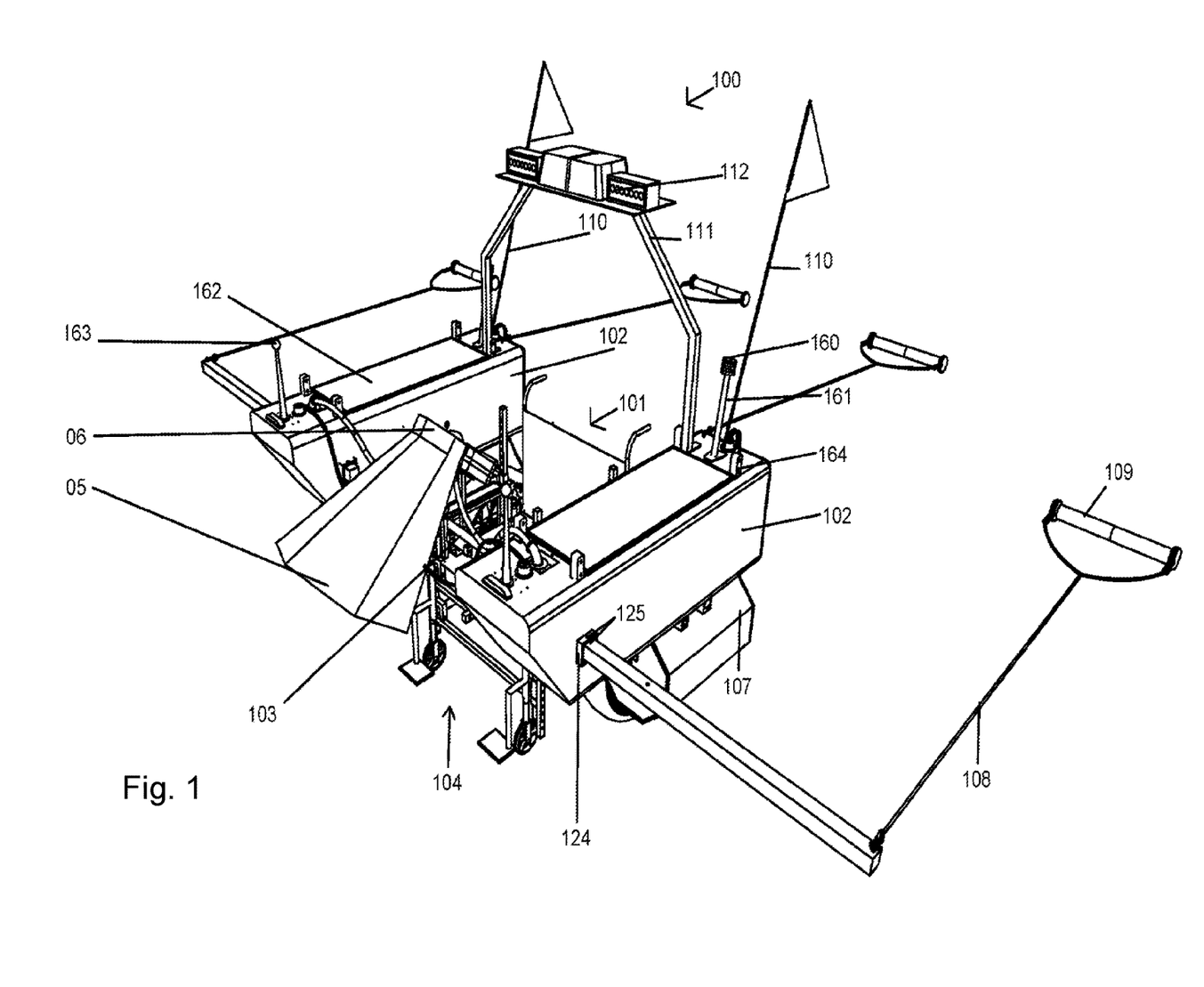
FIG. 1 shows a front top perspective view of a catamaran for a wheelchair in accordance with a first embodiment.

FIG. 1 shows a catamaran 100 for a wheelchair 101. The catamaran 100 comprises two parallel pontoons 102 secured abeam a bow beam 103. The catamaran 100 further comprises a wheelchair engaging framework 104 which supports the pontoons 102 for selective attachment and submersion of a wheelchair in water between the pontoons 102 and behind the bow beam 103 as a substantially shown in FIG. 1.

The catamaran 100 further comprises a pair of electric thrusters 107 submerged beneath respective pontoons 102 for propulsion.

In this way, and as will be described in further detail below, the catamaran 100 allows for the relatively easy attachment of various types of wheelchairs for recreational watersport for those of limited mobility. In this regard, the catamaran 100 may comprise a forward semi-submerged underwater viewing hood 105 and view port 106 for submarine viewing. Furthermore, in embodiments, various tow ropes 108 and handles 109 may be pulled by the catamaran 100 to draw attendees behind the catamaran 100.

High visibility flags 110 may be provided in embodiments. In embodiments, a lighting gantry 111 having lighting 112 thereatop may be selectively attached to the pontoons 102. In embodiments, safety lighting 160 may be supported atop stems 161. The safety lighting 160 may comprise a red port light and a green starboard light. Radio antenna 163 may be provided also.

Figure 4:
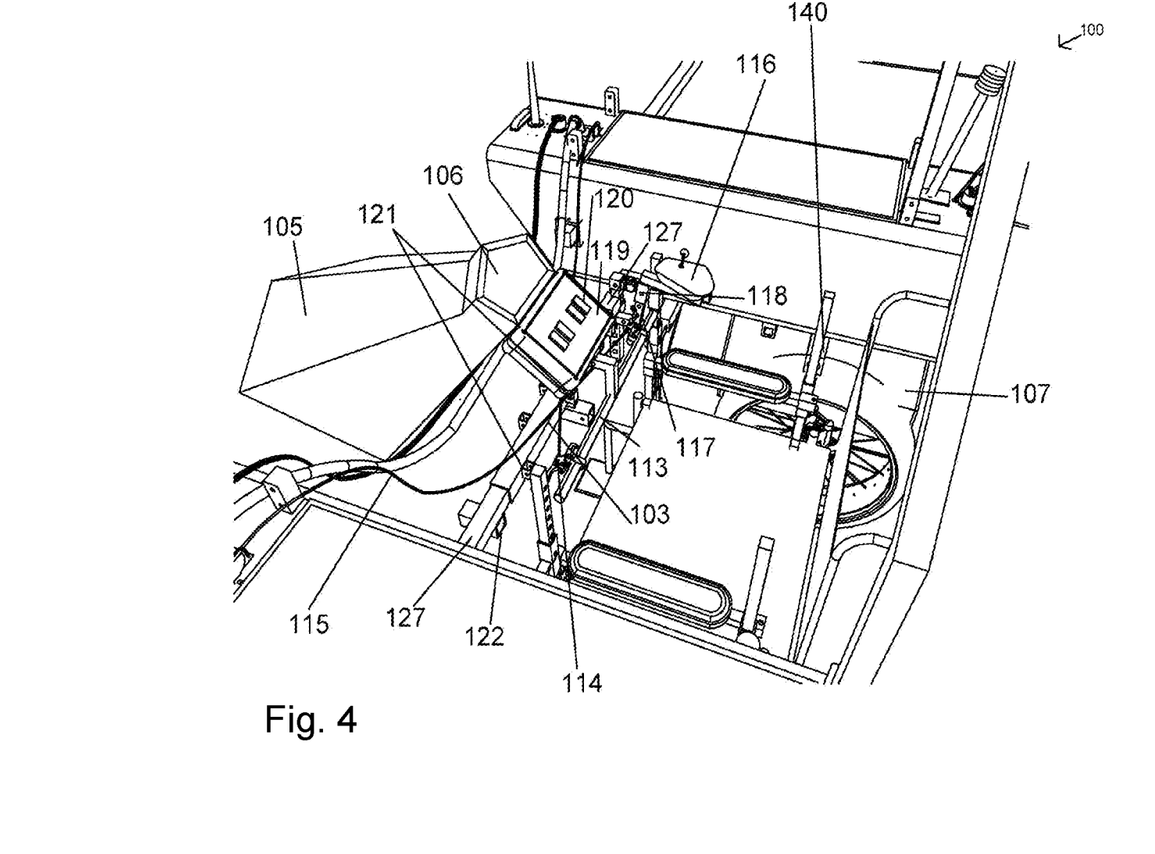
FIG. 4 shows a top perspective view of the cockpit of the catamaran in further detail.

FIG. 4 shows the cockpit of the catamaran 100 in further detail. As can be seen, various control accessories may be attached to the bow beam 103. For example, in the embodiment shown, the catamaran 100 may comprise a handlebar 113 comprising control handles 114 each tensioning a cable 115 for controlling respective thrusters 107. Given the configuration of the handlebar 113, actuation of the left-hand handle 114 powers the right handed thruster 107 such that the catamaran 100 turns left and vice versa. For forward propulsion, the operator would operate both handles 114 simultaneously.

In embodiments, an electromechanical joystick control 116 may be provided for electronic control of the catamaran 100, including the operation of the thrusters 107. In the embodiment shown, the electromechanical joystick control 116 may be height adjustable using a slidable shaft 117 selectively retained at differing vertical offsets within a right-angled sleeve 118. The joystick control 116 may have horizontal adjustment in embodiments.

In embodiments, a central control interface 119 having a plurality of buttons 120 may be additionally or alternatively provided for the control of various functionality of the catamaran 100.

As such, as can be appreciated, the catamaran 100 can be configured according to the differing abilities of the users.

In this regard, as can be further seen from FIG. 4, the bow beam 103 is configured for modular attachment of desirous componentry thereto. In this regard, the bow beam 103 may comprise a plurality of vertically orientated sleeves 121 and/or a plurality of horizontally orientated sleeves 122 within which various componentry holding shafts may be inserted vertically or horizontally. The sleeves 121, 122 may comprise offset adjustment apertures 123 through which pegs may secure a shaft inserted therein. In this way, and as is illustrated in FIG. 4, the underwater viewing hood 105, central control interface 119, joystick controller 116 and/or handlebar 113 may be easily attached to the various available sleeves 121, 122 of the bow beam 103.

As such, and for example, for a user having use of both hands, the handlebar 113 may be quickly and easily attached to the bow beam 103 and the associated control cables 115 installed to control the various thrusters 107. Alternatively, for users not having the ability of both arms or only of one arm, the central control interface 119 or joystick controller 116 may be alternatively or additionally installed in a modular fashion for the control of the thrusters 107 and other functionality of the catamaran 100.

In a preferred embodiment, the width of the catamaran 100 may be controlled by the selective adjustment of the lateral offset of the pontoons 102 along the bow beam 103. In this regard, and as a substantially shown in FIG. 1, in accordance with this embodiment, the pontoons 102 may comprise a transverse sleeve 124 through which the bow beam 103 is able to slide. In this way, the lateral offset of the pontoons 102 may be adjusted so as to, for example, accommodate wheelchairs 101 of differing widths. The pontoons 102 may be locked in place along the bow beam 103 by way of locking pin apertures 125.

The sleeves 124 may be located at forward regions of the pontoons 102. Furthermore, the sleeves 124 may non-rotatably engaged the bow beam 103 such by both the sleeve 124 and the bow beam 103 comprising corresponding rectangular cross sections as shown.

Furthermore, in a preferred embodiment, the bow beam 103 is telescopic so as to allow for the length adjustment of the bow beam 103 and also for the assembly/disassembly of the bow beam 103 as required. Specifically, FIG. 4 shows the bow beam 103 comprising a central telescopic member 126 and smaller lateral telescopic members 127 slidably retained within the central telescopic member 126 and which may be secured in place by way of locking pin apertures 128. In this embodiment, and wherein a plurality of locking pin apertures 128 are provided for the lateral telescopic members 127, the lateral extent of the lateral telescopic members 127 with respect to the central telescopic member 126 may be selectively adjusted. Additionally, or alternatively, and as alluded to above, the lateral telescopic members 127 may be removed entirely from the central telescopic member 126 for the modular disassembly of the catamaran 100.

Each pontoon 102 may be lifted by way of appropriately located lifting lugs 164.

Figure 2:
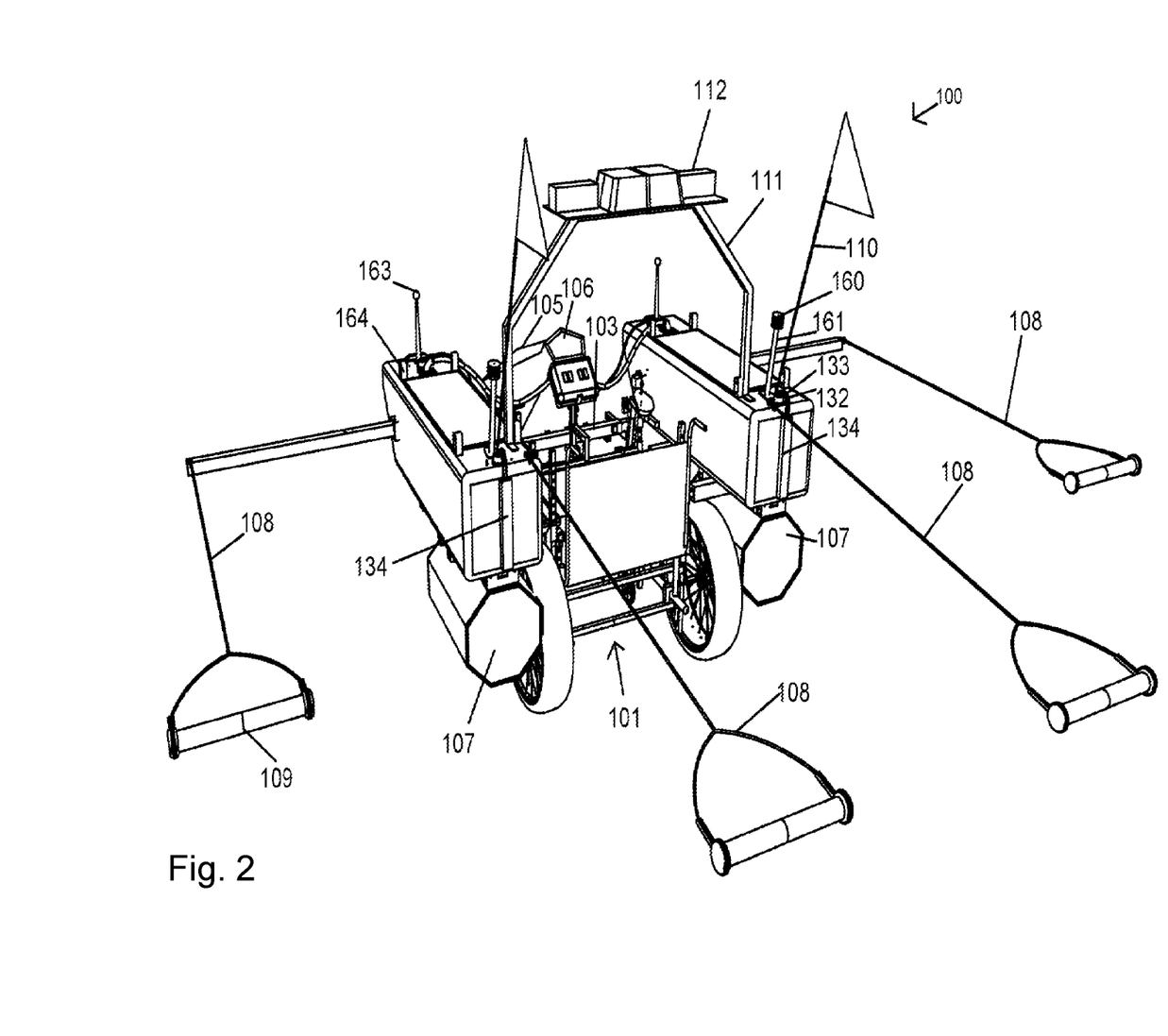
FIG. 2 shows a rear top perspective view of the catamaran.
Figure 3:
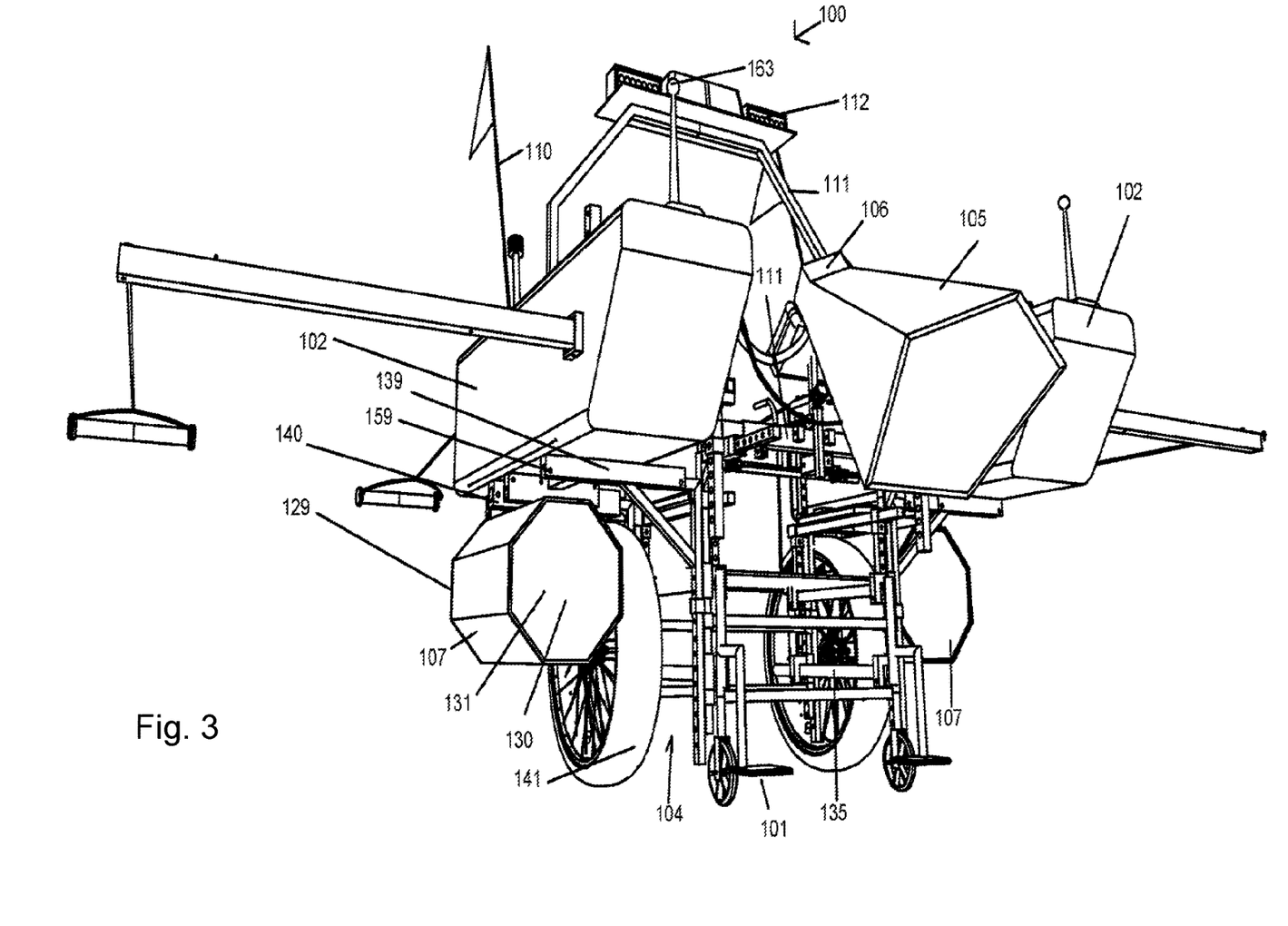
FIG. 3 shows a front bottom perspective view of the catamaran.

FIG. 3 shows the underside perspective view of the catamaran 100 illustrating the manner of engagement of the thrusters 107 beneath respective pontoons 102. In embodiment shown, the thrusters 107 may comprise a cylindrical cowl 129 and forward and, in embodiments, a rearward mesh 130 so as to safely isolate the impeller 131 therein. FIG. 2 illustrates the power supply and electronic control wiring 132 for the thrusters 107 emanating from a bung 133 at a top surface of the pontoons 102 and being reticulated down a rear surface of the pontoons 102 with an electrical covering channels 134 to reach the thrusters 107. The upper surface entry of the wiring 132 reduces likelihood of pontoon 102 leakage. The upper surfaces of the pontoons 102 may comprise removable coverings 162 to access batteries and various electronic componentry therein. In embodiments, the hollow pontoons 102 may hold 12 V electrical batteries therein which may be selectively configured for 12 or 24 V supply of the thrusters 107.

Figures 5, 6:
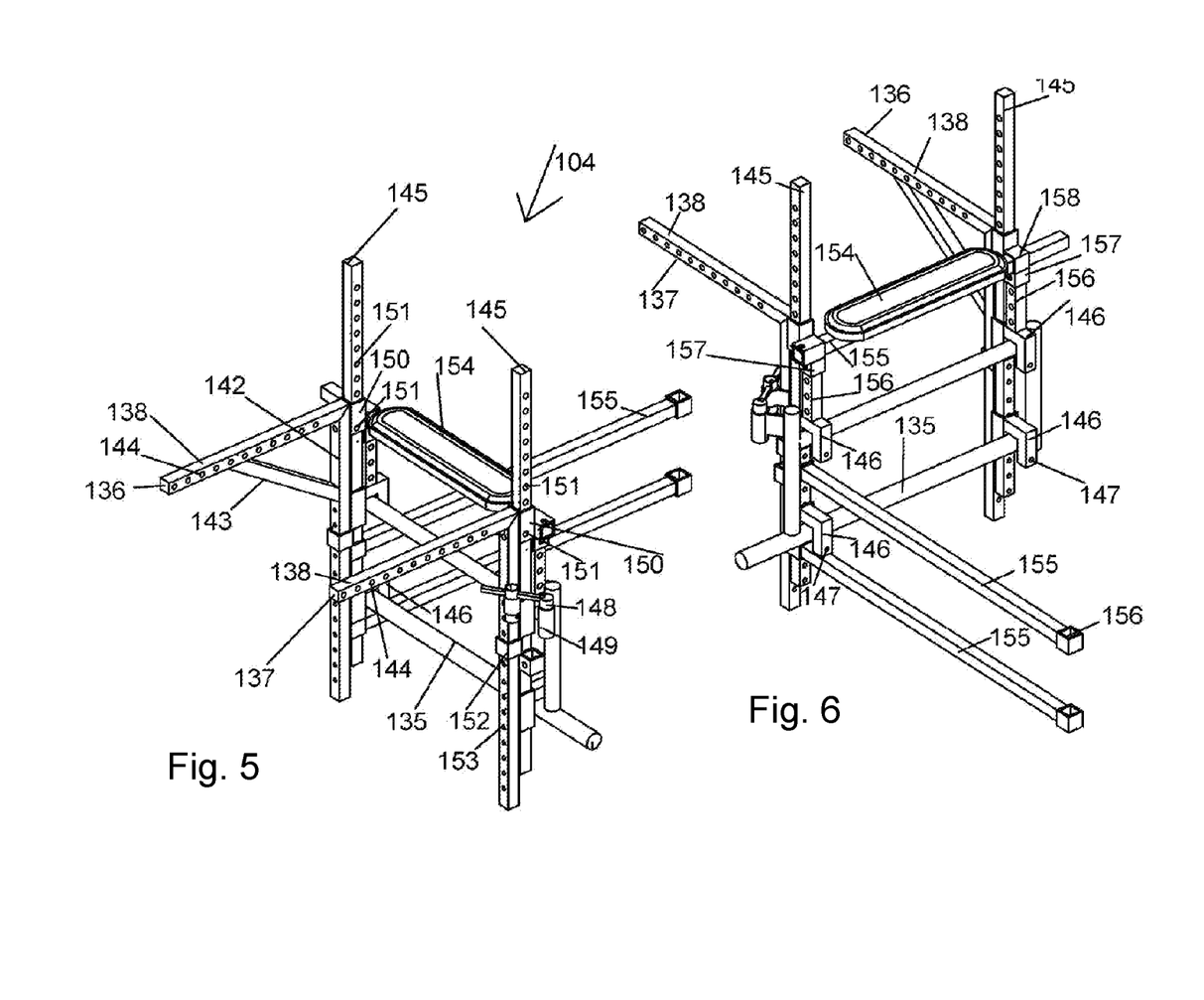
FIGS. 5 and 6 show the wheelchair engaging framework of the catamaran in further detail.

FIG. 3 illustrates the pontoons 102 comprising a plurality of transverse pontoon attachment brackets for the attachment of the wheelchair engaging framework 104 for which will be described in further detail with reference to FIGS. 5 and 6.

In this regard, the thrusters cowling 129 may attach beneath these transverse attachment brackets so as to be entirely submerged underwater in use. However, as can be seen, the thrusters 107 are located above the lowest extent of the wheels of the wheelchair 101 allowing for transportation on land.

FIG. 3 illustrates the manner of engagement of the wheelchair frame 135 by the wheelchair attachment framework 104. Specifically, with reference to FIGS. 3, 5 and 6, there is shown the wheelchair engaging framework 104 comprising a forward pontoon attachment member 136 and a rearward pontoon attachment member 137. Each of the forward and rearward pontoon attachment members 136, 137 comprise horizontal bars 138 which are retained within a respective forward attachment bracket and a rearward attachment bracket 140.

As can be appreciated, the horizontal bars 138 can be inserted at differing lateral offsets within the corresponding attachment brackets 139, 140 so as to be able to engage the pontoons 102 at differing lateral offsets and accommodate wheelchairs 101 of differing widths.

Furthermore, in the embodiment especially shown in FIG. 3, the wheelchair 101 may comprise widened beach-going tyres 141 of greater width than conventional wheelchair tyres especially being suited for beach sand. In this regard, the horizontal bars 138 provide sufficient reach across this type of beach tyre 141.

Each of the horizontal bars 138 may comprise a plurality of locking pin apertures 144 for locking the horizontal bars 138 at differing lateral offsets with respect to the pontoon attachment brackets 139, 140.

The forward pontoon attachment member 136 may further comprise a vertical bar 142 and supportive stay 143.

The wheelchair engaging framework 104 may further comprise wheelchair engaging members 145 which engage the wheelchair framework 135 by way of right-angled members 146 which locate over horizontal bar sections of the wheelchair framework 105. As can be seen from FIG. 6, the right-angled members may comprise a distal locking pin aperture 147 through which a pin may be inserted underneath the horizontal bar section inserted therein to retain the horizontal bar section.

As can be appreciated, the right-angled members 146 allow for the easy engagement of a wheelchair by lowering the wheelchair engaging framework 104 over the wheelchair framework 135.

The wheelchair engaging members 145 may further comprise cylindrical inserts 148 which locate within corresponding cylindrical sections 149 of the wheelchair framework 135.

In a preferred embodiment shown, the wheelchair engaging in members 145 may be height adjustable with respect to the forward and rearward pontoon attachment members 136, 137. In this regard, and as is shown, the wheelchair engaging members 145 may slidably locate within sleeves 150 of the forward and rearward pontoon attachment members 136, 137 and which may be further locked in place at desirous vertical offsets by way of locking pin apertures 151. In this way, the height of the wheelchair 101 may be controlled with respect to the pontoons 102 so as to, for example, control the extent of submersion of the wheelchair 101 in use.

Furthermore, in embodiments, the right-angled members 146 may be height adjustable with respect to the wheelchair engaging members 145. In embodiment shown, the vertical right-angled members 146 comprise sleeves 152 within which the wheelchair engaging members 145 are slidably retained and which may be similarly locked in place by way of locking apertures 153. In this way, the lower right-angled members 146 may be adjusted according to differing sized wheelchair frames 135.

In the embodiment shown, the wheelchair engaging framework 104 further supports armrests 154. In this regard, the armrest 154 may be supported by transverse bar 105 which are vertically retained by vertical posts 156 slidably retained within corresponding sleeves 157 of the wheelchair engaging members 145 and which may be locked in place by way of locking pin apertures 158. In this way, the vertical offset of the armrest 154 may be adjusted.

The wheelchair engaging framework 104 may further comprise pairs of forward and rearward transverse bracing bars 155 with distal rectangular collars 156 at each end which attach to respective vertical wheelchair engaging members 145 at various height offsets there along.

With reference to FIG. 4, the rearward pontoon attachment bracket 140 may comprise sufficient inner circular diameter allowing for the rotation of the rearward pontoon attachment member 137 therein.

In this way, to engage the wheelchair 101 to the catamaran 100, the rearward pontoon attachment members 137 may be inserted within the respective rearward attachment brackets 140 with the remainder of the wheelchair attachment framework 104 being attached to the wheelchair 101.

Thereafter, the pontoons and rearward pontoon attachment members 107 engaged thereto may be lowered over the wheelchair 101 until such time that the rearward pontoon attachment member sleeves 150 slide over the rearward wheelchair attachment member 145.

While being lowered in this way, the pontoons may be pitched upwardly at the front by virtue of the rearward pontoon attachment member 137 being able to freely rotate within the rearward attachment bracket 140. Once the rearward sleeve 150 is locked in place, the front of the pontoons 102 may be lowered such that the horizontal bars 138 of the forward pontoon attachment member 136 locates within the under channel of the forward attachment bracket 139. Once located within the forward attachment bracket 139, the forward pontoon attachment member 136 may be locked in place by way of locking pin apertures 159.

Figure 7:
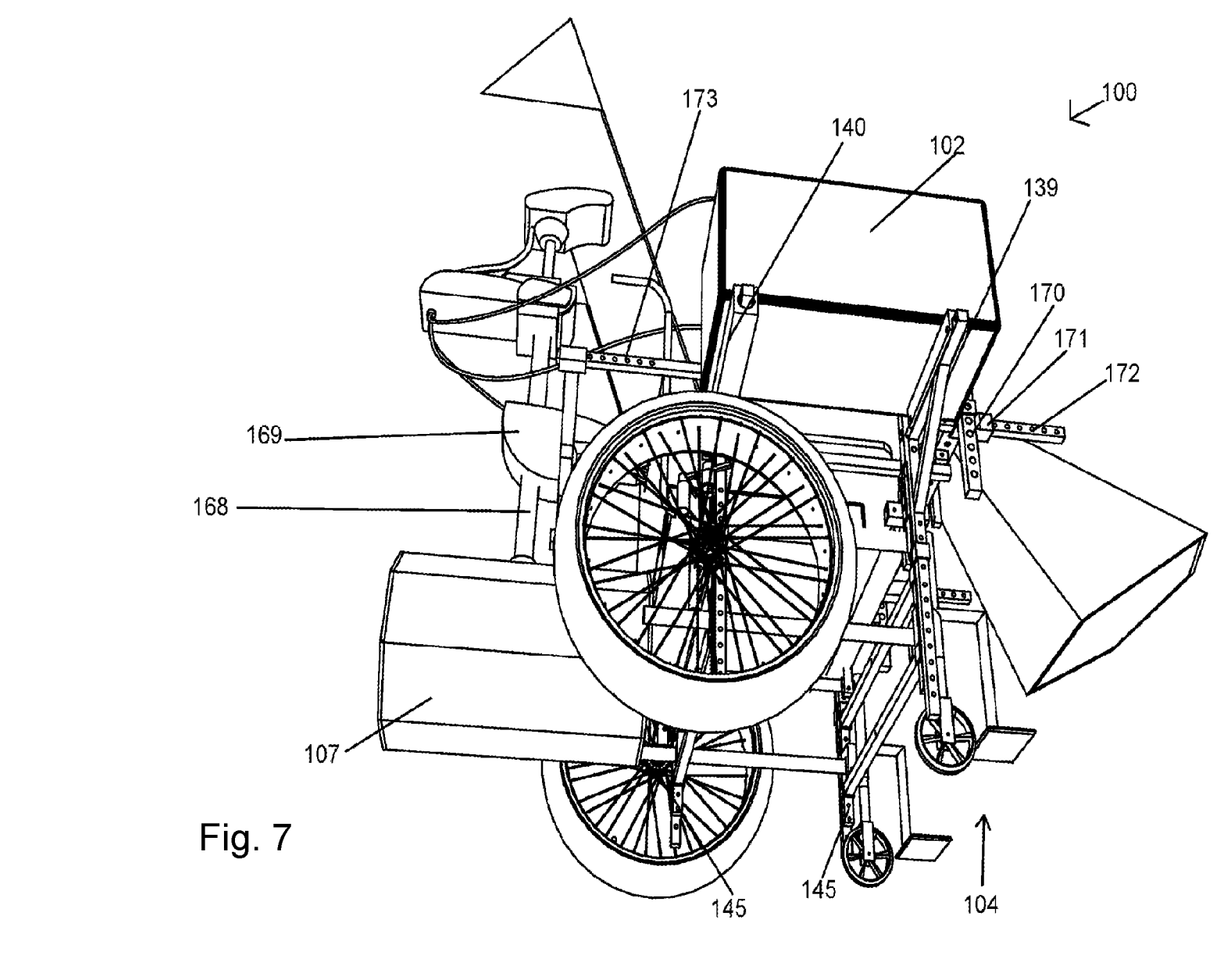
FIG. 7 shows a bottom perspective view of the catamaran in accordance with the second embodiment.
Figure 8:
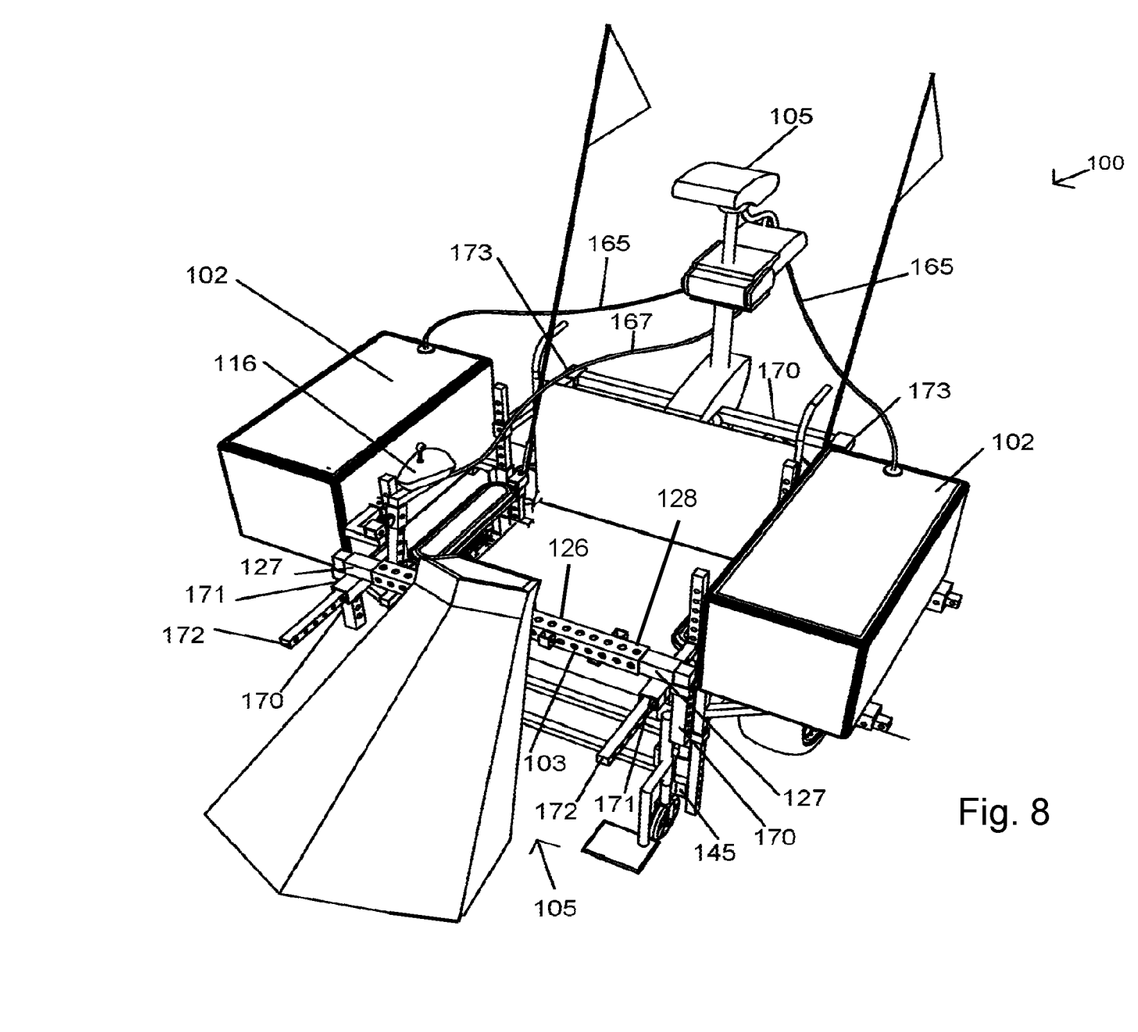
FIG. 8 shows a top perspective view of the catamaran of the second embodiment.
Figure 9:
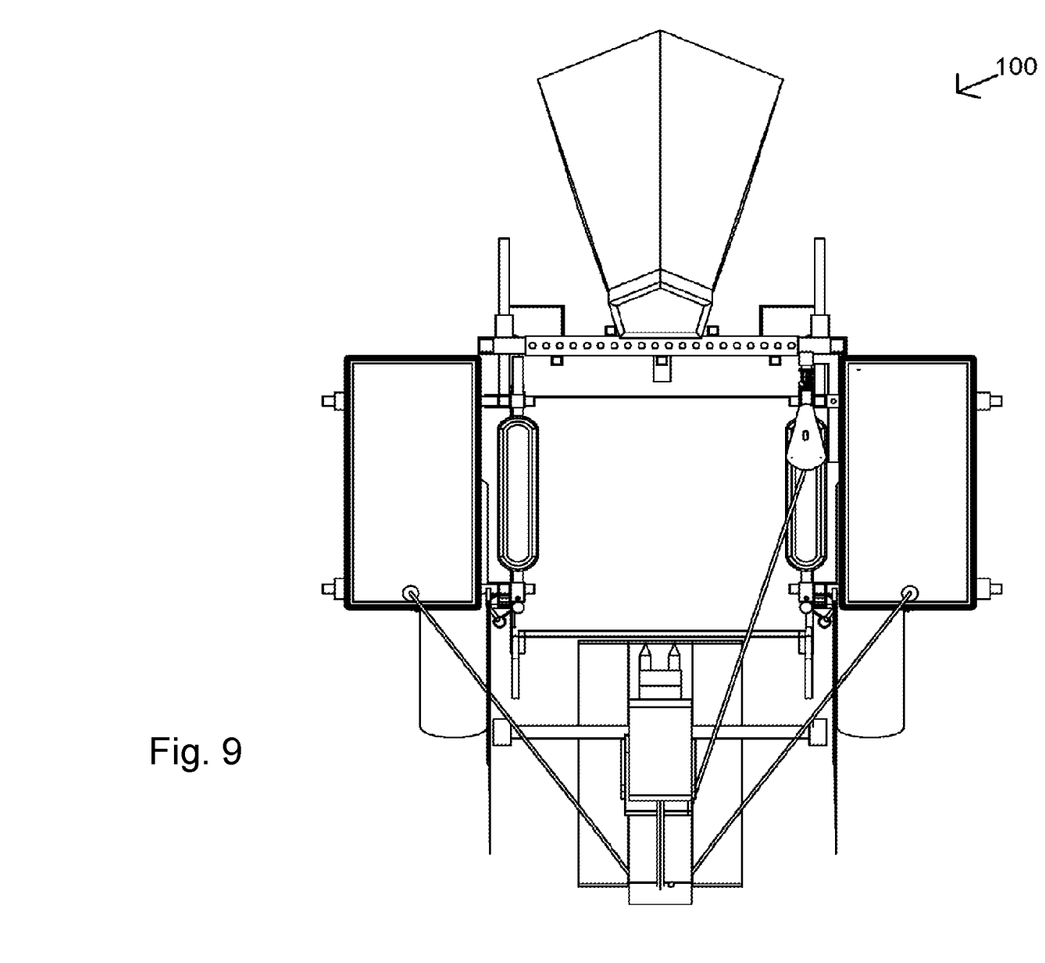
FIG. 9 shows a top plan view of the catamaran of the second embodiment.
Figure 10:
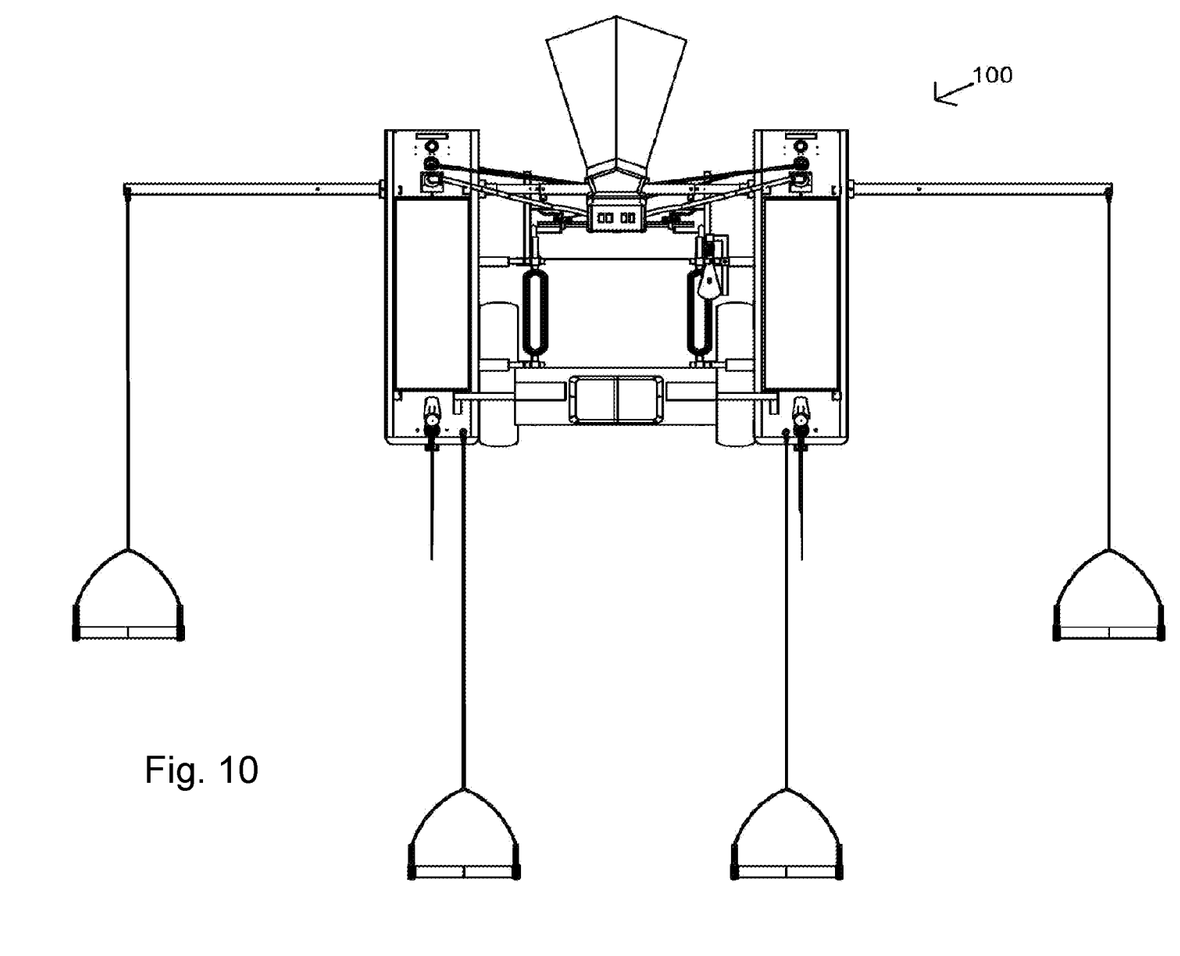
FIG. 10 shows a top plan view of the catamaran of the first embodiment.

FIGS. 7 and 8 show the catamaran 100 in accordance with a second embodiment. In accordance with the second embodiment, the catamaran 100 is characterised in comprising a single centrally located rearward thruster 107 mounted at an inferior end of a steering column 168 which is supported by rearward bracket 169 held by transverse crossbar 170 and turned by steering actuator 166. The steering actuator 166 may draw power via electrical cables 165 from batteries located within the pontoons 102 and receive control instructions via control cable 167 from the controller 116.

In accordance with the second embodiment, the wheelchair attachment framework 104 comprises the wheelchair engaging members 145 for attachment to the wheelchair 101. The wheelchair engaging members 145 interface with forward and rearward pontoon attachment members 136, 137 which interface with forward and rearward pontoon attachment brackets 139, 140 respectively allowing the convenience of engagement of the pontoons 102 to the wheelchair 101 in the aforedescribed manner.

The second embodiment 100 may be further characterised in the bow beam 103 yet engaging lateral telescopic members 127 but wherein the lateral telescopic members 127 do not protrude through the pontoons 102 laterally as described above, but rather take the form of a right angles bracket having vertical members 170 which engage collars 171 which slide forward and rearward along forwardly orientated attachment bars 172. In this way, the width between the pontoons 102 and the forward location of the bow beam 103 adjusted as required.

The wheelchair attachment framework 104 further comprises rearward orientated attachment bars 173 between which the transverse crossbar 170 similarly forwardly and rearwardly slidably engages.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A catamaran for a wheelchair, the catamaran comprising:
   two parallel pontoons secured abeam a bow beam; and
   a wheelchair engaging framework for selective attachment and submersion of a wheelchair in water between the pontoons behind the bow beam in use;
   further comprising a pair of thrusters located beneath respective pontoons;
   wherein the pair of thrusters controllable by a handlebar control comprising handles selectively tensioning control cables corresponding to each thruster; and
   wherein each handle is configured for controlling an oppositely located thruster.

2. The catamaran as claimed in claim 1, wherein the pair of thrusters are electrically controllable by way of at least one electrical control accessory.

3. The catamaran as claimed in claim 1, wherein the pontoons are slidably retained along the bow beam.

4. The catamaran as claimed in claim 3, wherein the pontoons each comprise a transverse sleeve through which the bow beam is slidably located.

5. The catamaran as claimed in claim 4, wherein the bow beam is non-rotatably located within each transverse sleeve.

6. The catamaran as claimed in claim 5, wherein the transverse sleeve and the bow beam comprise corresponding rectangular cross sections.

7. The catamaran as claimed in claim 4, wherein the sleeves are located at a forward location of the pontoons.

8. The catamaran as claimed in claim 1, wherein the bow beam comprises slidably engaged telescopic members.

9. The catamaran as claimed in claim 8, wherein the bow beam comprises a central telescopic member within which laterally opposite lateral telescopic members are slidably retained.

10. The catamaran as claimed in claim 1, wherein the bow beam comprises modular attachment brackets for the attachment of modular accessories thereto.

11. The catamaran as claimed in claim 10, wherein the attachment brackets comprise sleeves within which corresponding shafts of the accessories are slidably retained.

12. The catamaran as claimed in claim 11, wherein the sleeves comprise at least one of vertically orientated and horizontally orientated sleeves.

13. The catamaran as claimed in claim 12, wherein the bow beam comprises a rectangular cross-section and wherein the at least one of the vertically orientated and horizontally orientated sleeves are located on corresponding vertical horizontal surfaces of the rectangular bow beam.

14. The catamaran as claimed in claim 1, wherein horizontal bars are laterally offset adjustably engaged within the respective pontoon brackets.

15. A catamaran for a wheelchair, the catamaran comprising:
two parallel pontoons secured abeam a bow beam; and
a wheelchair engaging framework for selective attachment and submersion of a wheelchair in water between the pontoons behind the bow beam in use;
wherein the wheelchair engaging framework comprises forward and rearward pontoon attachment members each comprising horizontal bars engaged by respective forward and rearward pontoon brackets; and
wherein at least one of the horizontal bars is rotatably engaged within a respective bracket and the other horizontal bar engages within an open under channel of the other respective bracket.

16. The catamaran as claimed in claim 15, wherein the wheelchair engagement framework further comprises wheelchair attachment members for engaging a wheelchair framework of the wheelchair.

* * * * *